May 8, 1923.
W. H. RAPEPORT
1,454,407
BUMPER OR FENDER FOR AUTOS OR OTHER VEHICLES
Filed Nov. 4, 1922
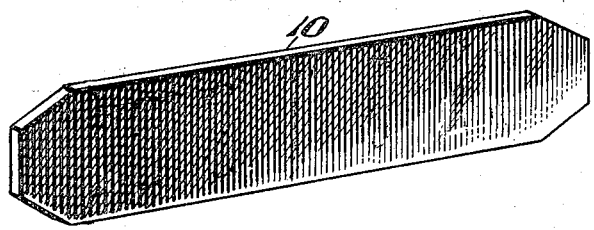
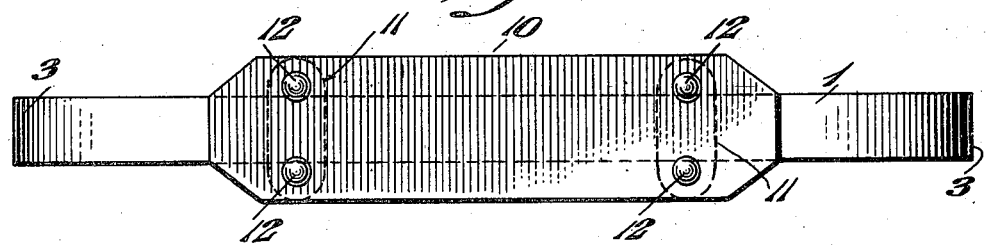
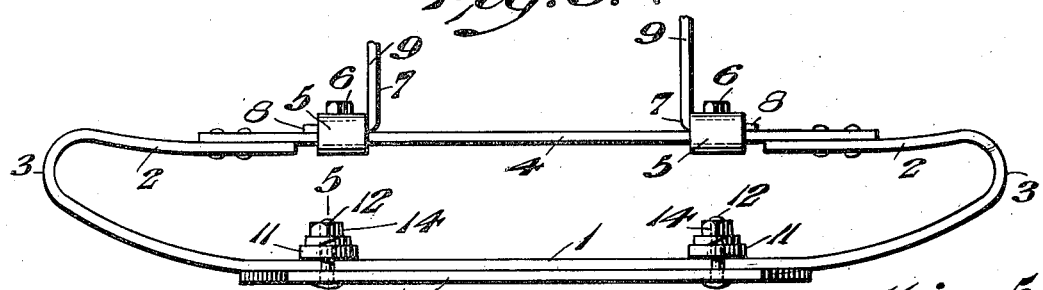
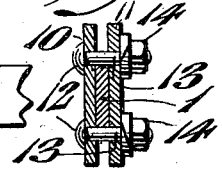
INVENTOR:
William H. Rapeport
BY Niederheim + Fairbanks
ATTORNEYS.

Patented May 8, 1923.

1,454,407

UNITED STATES PATENT OFFICE.

WILLIAM H. RAPEPORT, OF PHILADELPHIA, PENNSYLVANIA.

BUMPER OR FENDER FOR AUTOS OR OTHER VEHICLES.

Application filed November 4, 1922. Serial No. 598,977.

*To all whom it may concern:*

Be it known that I, WILLIAM H. RAPEPORT, a citizen of the United States, residing in the city and county of Philadelphia, State of Pennsylvania, have invented a new and useful Bumper or Fender for Autos or Other Vehicles, of which the following is a specification.

My invention consists in providing a bumper or fender proper for an auto or other vehicle with a plate on the front resilient bar thereof, the same being adapted to receive the impact or blow of a colliding vehicle or other object, thus relieving the fender proper of the direct action of such impact or blow and also forming a plate on which a colliding vehicle or object may rub in case of tangential impact or blow, instead of directly on the bumper or fender proper, said plate furthermore reinforcing and so strengthening the bumper or fender proper, novel means being provided for connecting said plate with said front resilient bar without piercing the latter as will be hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a member adapted to be applied to a bumper or fender proper embodying my invention.

Figures 2 and 4 represent front elevations of the same in position on the bumper or fender proper.

Figure 3 represents a top plan view thereof.

Figure 5 represents a vertical section on line 5—5 Figure 3.

Similar numerals of reference indicate corresponding parts in the figures.

Referring to the drawings, 1 designates the front bar of the fender proper, 2 the rear portions inturned therefrom, 3 the side loops or bends 3 which join said front bar and rear portions and the rear bar 4 which latter is formed of rigid material and has the inner terminals of said rear portions connected firmly therewith.

The members 1, 2, and 3 are constructed of metal or other suitable material of resilient nature, and the member 4 is constructed of metal or other suitable material of rigid nature. The members 1, 2, and 3 are each a single continuity, thus forming a strong structure of the fender proper while allowing the latter to be highly resilient to receive blows or shocks to which it may be subjected for evident purposes.

5 designates clips which are fitted on and embrace the bar 4 and clamped thereto by the bolts or screws 6. Fitted to the clips 5 are the elbows 7 whose front limbs 8 are secured thereto by the bolts or screws 6 and whose rear limbs 9 are adapted to be attached to the chassis of an automobile or other vehicle whereby the fender is supported in position on the latter.

On the outer face of the front bar 1 is the plate 10 which is wider in vertical direction than the width of said bar so as to overlap the top and bottom edges thereof, as most plainly shown in Figures 2, 4, and 5. In order to secure said plates to said bar 1 I apply to the rear face of the front bar 1, the straps 11 and secure the same to said bar by the headed bolts 12 which are passed through openings 13 in the plate 10, their shanks extending over the top and bottom edges of the front plate 1, and are passed through openings in said straps 11, their threaded ends having thereon the nuts 14 which when tightened clamp the straps and consequently the plate 10 firmly to the front bar 1 thus holding said plate firmly in place on the front bar and consequently on the fender, the shanks of the bolts by their contact with the top and bottom edges of the front member preventing the plate from shifting on said bar, this being a preferred form as the front bar is not pierced for the bolts and so its strength is preserved.

It will be seen that the plate 10 forms a broad surface which may be struck by an automobile or other vehicle, or in case of a collision may strike some object in its path, so that the resilient members of the bumper or fender proper may be preserved from the impact or blow while the pumper or fender is reinforced and so strengthened, especially in front for evident purposes.

Should the plate be injured it may be removed and substituted by a fresh plate leaving the fender proper intact or comparatively so.

Having thus described my invention what I claim as new and desire to secure by Letters Patent, is:—

A bumper or fender composed of front and rear members of resilient material, said members each being a single continuity, a rear bar of rigid material connected firmly with the inner terminals of said rear members, supporting devices for the bumper mounted on said rigid rear bar, a reinforcing and impact plate on the front member, said plate having its upper and lower portions projecting respectively above and below said front member, straps on the latter, said straps having their upper and lower portions projecting respectively above and below said front member, and securing bolts passing through said upper and lower portions of said plate, and of said reinforcing and guard plate, said bolts having their shanks extending across the upper and lower edges of said front member and being seated directly on said edges.

WILLIAM H. RAPEPORT.

Witnesses:
  JOHN A. WIEDERSHEIM,
  N. BUSSINGER.